Dec. 2, 1924.
L. T. GOSSMAN
STRAINER FOR CREAM SEPARATORS
Filed Aug. 2, 1922
1,517,725
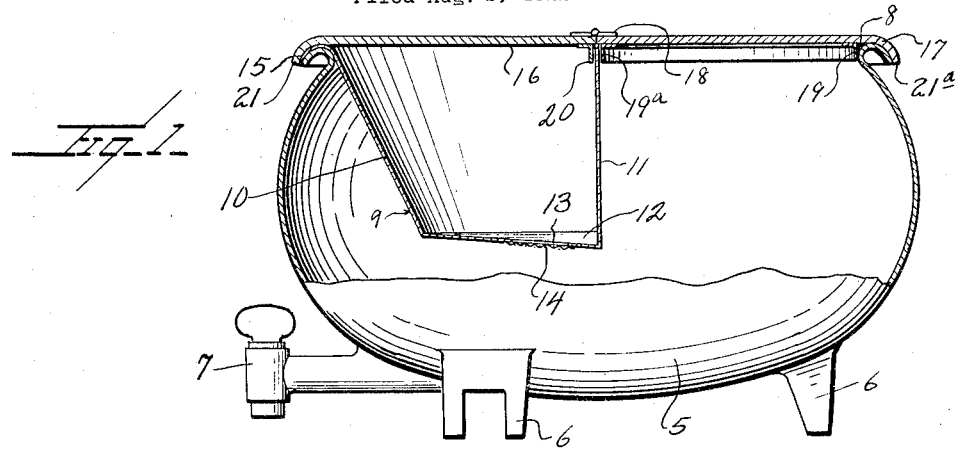
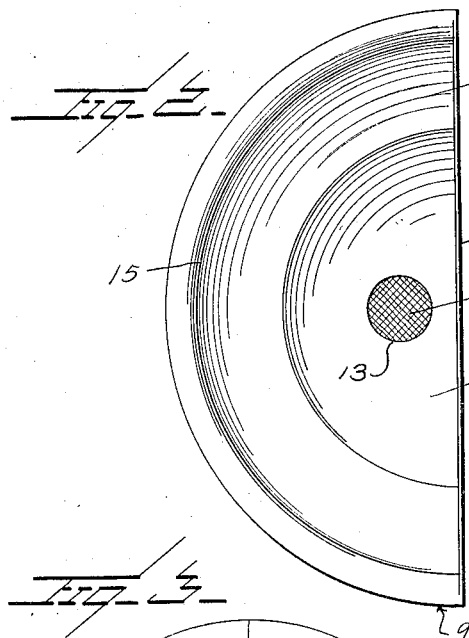
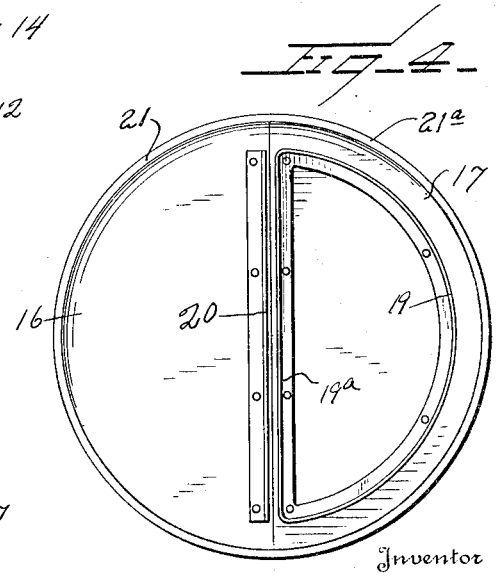
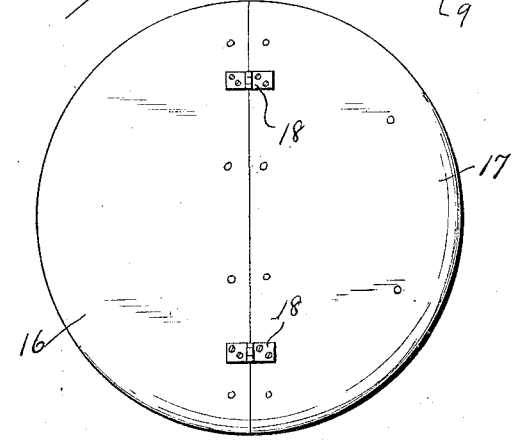
Inventor
L. T. Gossman
By Watson E. Coleman
Attorney Patented Dec. 2, 1924.

1,517,725

UNITED STATES PATENT OFFICE.

LEO THOMAS GOSSMAN, OF CANTON, MINNESOTA.

STRAINER FOR CREAM SEPARATORS.

Application filed August 2, 1922. Serial No. 579,159.

*To all whom it may concern:*

Be it known that I, LEO T. GOSSMAN, a citizen of the United States, residing at Canton, in the county of Fillmore and State of Minnesota, have invented certain new and useful Improvements in Strainers for Cream Separators, of which the following is a specification, reference being had to the accompanying drawings.

This invention relates to strainers for cream separators.

An object of the invention is to provide means whereby the milk may be strained as it is deposited in the supply can of the separator and wherein the usual quantity of milk may be deposited in the can, in view of the fact that the strainer does not occupy the entire mouth of the can.

Another object of the invention is to provide a strainer in the form of an attachment for the supply can of a cream separator, the receptacle or strainer being closed by a cover also adapted to close the open end of the supply can.

A further object of the invention is to provide a strainer of this character applicable to the conventional form of cream separator supply can, and wherein the strainer may be moved to any portion of the open end of the supply can for the reception of milk.

A still further object of the invention is to provide a strainer intended to occupy a portion of the upper open end of the supply can of a cream separator, and wherein a cover is provided for the can, a portion of said cover covering the contents of the can adjacent the strainer, and preventing disengagement of the strainer from the can.

With these and other objects in view, the invention consists in the improved construction and arrangement of parts to be hereinafter more particularly described, fully claimed and illustrated in the accompanying drawings, in which:—

Figure 1 is a sectional view of the conventional form of supply can showing the invention applied, the invention being also shown in section;

Figure 2 is a top plan view of the strainer receptacle;

Figure 3 is a top plan view of the cover; and

Figure 4 is a bottom plan view of the cover.

Referring to the drawings, 5 designates a supply can, such as used on the conventional form of cream separator, the can including the usual supporting means 6 and outlet cock 7, and a relatively large open end 8.

With the supply can now in use, no cover of any description is provided for the can, so that when the separator is not in operation, the can is not protected from dust, dirt, or like foreign matter. The can is thereby rendered unsanitary, requiring the supply can to be cleaned each time the separator is used, in addition to the cleaning necessary after the separation of the cream.

To eliminate this unsanitary condition, and at the same time permit the milk to be strained as it is deposited in the supply can, there is provided a novel form of strainer comprising a receptacle 9 including a semi-circular wall 10 and a straight wall 11. The ends of the circular wall 10 merge with the ends of the straight wall, by means of which the circular wall is made to conform to the curvature of the can. The purpose of making the wall 10 semi-circular is that the receptacle 9 does not entirely close the open end 8 of the can, but only half of the open end, the straight wall 11 being positioned at the central portion of the can. This leaves the remaining portion of the can unobstructed so that the usual quantity of milk may be deposited.

The semi-circular wall 10 is also tapered downwardly and extended inwardly toward the central portion of the can, the semi-circular bottom 12 being secured to the lower edge of the walls 10 and 11. By tapering the semi-circular walls inwardly, said walls serve to guide the milk toward the bottom 12. The bottom 12 is provided with a relatively large opening 13 over which a sheet of wire mesh 14 is placed, said sheet serving as the strainer. It will be noted that the central portion of the bottom, or that portion provided with the opening 13 is slightly depressed, so as to permit the milk to drain toward the opening and through the strainer.

The upper edge of the semi-circular wall 10 is extended outwardly at right angles to said wall to provide a semi-circular supporting flange 15, said flange being adapted to engage the upper edge of the open end 8 of the supply can, so as to suspend the strainer receptacle in the can. By this novel arrangement, one-half of the can is occupied by the strainer, the other half being free to receive the same quantity of milk usually deposited in the supply can. If desired, after the milk has been strained the strainer may be removed as it is not permanently attached to the supply can.

In order to increase the sanitation of the supply can, a novel form of closure or cover is provided, said cover including sections 16 and 17, each section being semi-circular in form. The straight edges of each section are disposed in confronting relation. Hinges 18 are secured to the confronting edge portions of the sections, so as to permit movement of said sections relative to each other. The lower face of the section 17 is provided with a depending flange 19 which is adapted to engage the inner edge of the supply can. The section 16 is provided with a depending flange 20 disposed adjacent the hinged edge of said section, the remaining portion of the lower face of the section 16 being adapted to engage the flange of the strainer receptacle 9.

The outer curved edge of each of the sections 16 and 17 is curved downwardly to provide flanges 21 and 21ᵃ, said flanges cooperating to substantially provide a cap adapted to engage the rolled edge of the supply can. By this means the flange 21 cooperates with the flange 19 to substantially provide a channel for the reception of a portion of the rolled edge of the supply can to prevent accidental disengagement of the cover from the strainer and the supply can.

When the separator is not in use, the cover is intended to extend over the open end of the supply can to prevent the entrance of foreign matter, thereby maintaining the interior of the can in a sanitary condition. When it is desired to use the separator it is not necessary to remove the entire cover from the can, but simply raise the section 16 so as to uncover the strainer receptacle 9. The section 16 may be extended over and upon the section 17. The milk may then be discharged into the receptacle 9 through the strainer and into the supply can to be discharged in the separator in the usual manner. After the separating operation has been completed the strainer receptacle may be removed and cleaned, as well as the cover if necessary. When the section 16 is disposed in its closed position, or in other words, over the top of the receptacle 10, the flange 20 extends within the receptacle in parallel relation to the upper edge of the straight wall 11 and cooperates with the curved flange 21 to hold the strainer receptacle in the supply can. It will also be noted that the straight portion 19ᵃ of the flange 19 engages the outer face of the wall 11 and through the cooperation of the curved portion of the flange 19 and flange 21ᵃ, serves to hold the receptacle in the supply can, as the flange 19 is intended to frictionally engage the inner wall of the supply can.

From the foregoing it will be readily seen that this invention provides a novel form of strainer and cover for cream separators so constructed that the strainer does not occupy the entire upper portion of the supply can, but only half of said portion. In addition to this the strainer and cover may be applied to any conventional form of cream separator supply can. The separating operation is not only facilitated, but the supply can be rendered sanitary.

What is claimed is:—

1. In combination with the supply can of a cream separator, a receptacle having a curved wall, a strainer in the bottom of the receptacle, said receptacle extending from the edge of the can to the central portion of the can, and a sectional cover, the sections of the cover being hinged to each other, said cover being arranged to engage the top of the can and the receptacle.

2. In combination with the supply can of a cream separator, a receptacle having a curved wall, and a straight wall, said straight wall being disposed at the central portion of the can, the curved wall of the receptacle having a flange adapted to engage the edge of the can, a bottom in said receptacle, a strainer carried by said bottom, and a sectional cover engaged with the can and the strainer, the sections of the cover being hinged to each other, one of said sections having a depending flange adapted to engage the inner face of the supply can and the straight wall of the receptacle to assist in holding the receptacle in the can, the remaining section being adapted to extend over and engage the flange of the receptacle.

3. In combination with the supply can of a cream separator, a receptacle having a semi-circular wall, the upper edge of said wall having a flange adapted to engage a portion of the edge of the can, a straight wall merging with the ends of the semi-circular wall, said semi-circular wall tapering from the flange thereof to the lower edges of the receptacle, a semi-circular bottom carried by the receptacle, said bottom having an opening, wire mesh fabric disposed over said opening, and a sectional cover having its inner confronting edges hinged to each other, one of said sections having a depending flange, a portion of said flange engaging the inner edge of the can, the remaining portion of the flange engaging the outer face of the straight wall of the receptacle, the remaining section of the cover having a flange adapted to extend into the receptacle.

In testimony whereof I hereunto affix my signature.

LEO THOMAS GOSSMAN.